United States Patent [19]

Braat et al.

[11] 4,415,238

[45] Nov. 15, 1983

[54] SINGLE LENS HAVING ONE SPHERICAL AND ONE ASPHERICAL REFRACTIVE SURFACE

[75] Inventors: Josephus J. M. Braat; Jan Haisma; Gijsbert Prast, all of Eindhoven, Netherlands

[73] Assignee: U.S. Philips Corporation, New York, N.Y.

[21] Appl. No.: 307,717

[22] Filed: Oct. 2, 1981

[30] Foreign Application Priority Data

Jul. 13, 1981 [NL] Netherlands ............... 8103323

[51] Int. Cl.³ .............................. G02B 13/18
[52] U.S. Cl. .................................... 350/432

[58] Field of Search ............................ 350/432

[56] References Cited

U.S. PATENT DOCUMENTS 4,027,952  6/1977  Hugues ................... 350/432

Primary Examiner—John K. Corbin
Assistant Examiner—Rebecca D. Gass
Attorney, Agent, or Firm—Robert J. Kraus

[57] ABSTRACT

A lens having a spherical surface and an aspherical surface curved relative to each other to minimize coma for a large diffraction-limited field and a large numerical aperture.

1 Claim, 1 Drawing Figure

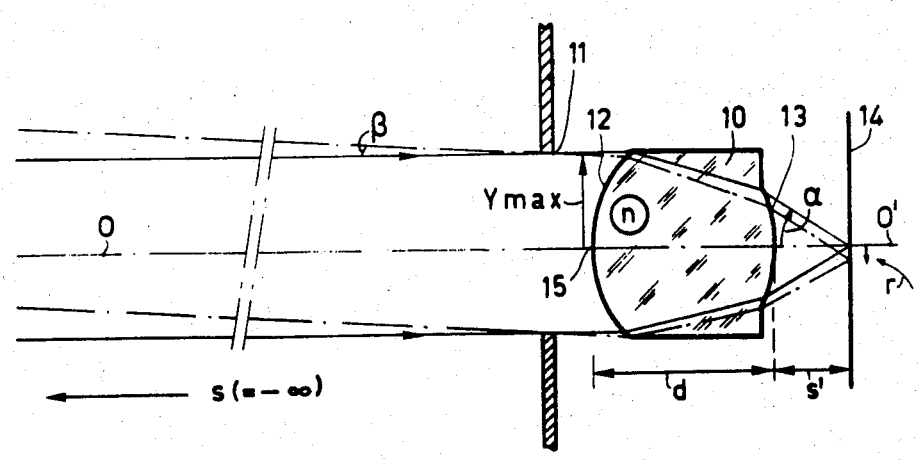

SINGLE LENS HAVING ONE SPHERICAL AND ONE ASPHERICAL REFRACTIVE SURFACE

BACKGROUND OF THE INVENTION

The invention relates to a single lens having one spherical and one aspherical refractive surface. Such a lens, briefly referred to as a mono-aspherical lens, is known, for example, from British Patent Specification No. 1,499,861. The known mono-aspherical lens has a small numerical aperture and a small diffraction-limited field.

A conventional lens having two spherical surfaces produces an image of an axial point, which image is not diffraction-limited, especially at larger numerical apertures. If one surface of the lens is made aspherical a perfect (aberration free) image of the axial point can be obtained. Making only one surface aspherical does not, however, guarantee a high image quality of non-axial object points.

In order to strictly satisfy the Abbe sine condition it is known, for example, from British Patent Specification No. 1,512,652 to make both refractive surfaces of the lens aspherical.

Surprisingly the Abbe sine condition can be met substantially for mono-aspherical lenses having a large numerical aperture. To achieve this a suitable lens shape should be selected from the multitude of possible mono-aspheres. The choice of the lens shape with a maximum diffraction-limited field demands minimization of coma. By means of the third-order aberration theory it is possible to calculate for which lens shape third-order coma disappears in the case of a mono-aspherical lens whose focal length, refractive index, thickness and positions of the object plane and image plane are given.

It is found that for large numerical apertures (NA22 0.25) the third-order aberration theory is inadequate. Then, in order to obtain mono-aspherical lenses with a large diffraction-limited field, a specific amount of third-order coma has to be accepted; these requirements seem to be conflicting.

SUMMARY OF THE INVENTION

The invention is based on the recognition that for a large diffraction-limited field and a large numerical aperture third-order coma can be compensated for by higher-order coma.

The lens shapes having this compensating effect are selected from a number of mono-aspherical lenses by ensuring that the diffraction-limited field is as large as possible by means of exact ray calculations.

The lens shape having the property that the third-order coma is zero may serve as a basis for the calculation. The result of the calculation is a lens which substantially complies with the Abbe sine condition and which consequently has a large diffraction-limited field.

The invention is characterized in that the spherical refractive surface and the aspherical refractive surface are in a relationship with each other which is represented by a set of straight lines:

$$\frac{c_2}{c_1} = a\left[\frac{d}{(n-1)f}\right] + b \text{ for } 1.00 \leq \frac{d}{(n-1)f} \leq 1.35,$$

in which the expressions for a and b are:

$$a = 4.85 \, (NA) - 0.32 \, n - 2.39$$

$$b = -4.10 \, (NA) + 1.20 \, n + 0.46$$

where $c_1$ is the curvature of the spherical surface at its intersection with the optical axis, $c_2$ is the curvature of the spherical surface, d is the thickness of the lens, n is the refractive index, f is the focal length, and NA is the numerical aperture. Additionally the requirement that $0.3 \leq NA \leq 0.5$; $1.5 \leq n \leq 2.0$ and the magnification $V \leq 0.1$ should be met.

The calculations for an arbitrary mono-aspherical lens are effected in accordance with the criterion that the lens should be free from spherical aberration. In that case the optical path-lengths of all rays from the axial object point to the associated axial image point are equal.

In general it is not possible to find analytical expressions for the co-ordinates of the desired aspherical surface. However, by means of modern computing devices it is no problem to make the path-lengths iteratively equal to each other for a number of rays or, correspondingly, to have all image rays pass through one point.

In order to minimize the computing time it is alternatively possible to solve the problem analytically as far as possible and to effect only the last step numerically, namely solving one transcendental equation, compare E. Wolf, Proc. Phys. Soc., 61, 494 (1948).

Both methods ultimately define to a set of discrete points of the desired spherical surface. Alternatively, an approximative curve may be constructed through this set of points, which is represented by a series expansion. The coefficients of this expansion then uniquely define the aspherical surface.

BRIEF DESCRIPTION OF THE DRAWING

The invention will be described in more detail with reference to the drawing, which is the sole FIGURE represents a lens in accordance with the invention with the path of the rays from an object at infinity through the lens to the image plane.

DESCRIPTION OF THE PREFERRED EMBODIMENTS

In the FIGURE a mono-aspherical lens in accordance with the invention is designated 10. Starting from an object disposed at infinity ($s = -\infty$) two pairs of marginal rays are shown, one pair parallel to the optical axis 00', the other pair at an angle $\beta$ with the optical axis. "Marginal rays" are to be understood to mean those rays which just pass the edge of the aperture 11. The marginal rays refracted by the aspherical surface 12 pass through the lens 10 of a thickness d and after being refracted by the spherical surface 13 of the lens 10 they converge in the image plane 14. The convergence point of the marginal rays which are parallel to the optical axis 00' is disposed on the axis and the convergence point of the marginal rays which are incident at an angle $\beta$ with the optical axis 00' at a distance r from the axis. The diameter of the aperture 11 and thus the effective diameter of the lens 10 is $2y_{max}$, the diffraction-limited image in the image plane having a diameter 2r. The distance between the spherical surface 13 and the image plane 14 is s'. The angle between the optical axis 00' and the marginal rays which have been retracted by the surface 13 and which are incident on the surface 12 parallel to the optical axis is $\alpha$. For the numerical aperture NA and the angle $\alpha$ the relationship NA=sin $\alpha$ is valid.

In the following examples a specific refractive index n, a specific thickness d and a specific focal length f of the lens were selected as a basis for the calculations.

The paraxial curvatures $c_1$ and $c_2$ of the lens surfaces were varied using those curvature values for which the third-order coma is zero as a starting point. Subsequently the lens shape was determined by means of exact ray calculations (by varying $c_1$ and $c_2$) for which, at a large numerical aperture, the image quality of the lens was optimum beyond axis.

In a first embodiment the lens 10 had a refractive index n=2.0, a thickness d=10.5 mm, a focal length f=8 mm, and a numerical aperture NA=0.4. The distance between the object and the lens 10 is s=−160 mm and the distance between the lens 10 and the image plane 14 is s′=5.471 mm.

At the intersection 15 of the surface 12 with the optical axis 00′ the aspherical surface 12 has a curvature $c_1=0.07$ mm$^{-1}$, while the spherical surface 13 has a curvature $c_2=-0.08696$ mm$^{-1}$.

The effective diameter of the lens $2y_{max}=6.76$ mm. The aperture 11 is disposed adjacent the surface 12. The diffraction-limited image in the image plane 14 has a radius $r\approx250$ μm.

The curve which approximates the aspherical surface 12 is represented by a series expansion with terms in which even Tschebycheff polynomials occur:

$$z = \sum_{n=0}^{4} g_n T_{2n}(ky)$$

Here z is the abscissa of the point on the spherical surface with the ordinate y, the abscissa being measured from the intersection 15. The coefficients of the terms are:

$g_0 = 0.184924$  $g_1 = 0.179480$
$g_2 = -0.005727$  $g_3 = -0.000293$
$g_4 = -0.000012$
while $k = 0.295863$.

In a second embodiment the lens 10 has a refractive index n=1.5; a thickness d=5.0 mm, a focal length f=8 mm, a numerical aperture NA=0.5. The distance between the object and the lens 10 is s=−160 mm and the distance between the lens and the image plane 14 is s′=5.685 mm.

At the point of intersection 15 with the optical axis 00′ the aspherical surface 12 has a curvature $c_1=0.205$ mm$^{-1}$, which the spherical surface 13 has a curvature $c_2=0.06835$ mm$^{-1}$.

The effective diameter of the lens is: $2y_{max}=8.624$ mm. The aperture 11 is disposed adjacent the surface 12. The diffraction-limited image in the image plane 14 has a radius $r\approx50$ μm.

The curve which approximates the aspherical surface 12 is represented by a series expansion with terms in which even Tschebycheff polynomials occur:

$$z = \sum_{n=0}^{6} g_n T_{2n}(ky)$$

The coefficients of terms are:

$g_0 = 0.956078$  $g_1 = 0.953333$
$g_2 = -0.005314$  $g_3 = -0.002753$
$g_4 = 0.000175$  $g_5 = 0.000012$
$g_6 = 0.000003$
while $k = 0.23193$.

What is claimed is:

1. A single lens having one spherical and one aspherical refractive surface, characterized in that the spherical refractive surface and the aspherical refractive surface are in a relationship with each other which is represented by a set of straight lines $$\frac{c_2}{c_1} = a\left[\frac{d}{(n-1)f}\right] + b \text{ for } 1.00 \leq \frac{d}{(n-1)f} \leq 1.35$$

in which the expressions for a and b are:

$$a = 4.85\,(NA) - 0.32\,n - 2.39$$

$$b = -4.10\,(NA) + 1.20\,n + 0.46$$

where $c_1$ is the curvature of the aspherical surface at its intersection with the optical axis, $c_2$ is the curvature of the spherical surface, d is the thickness of the lens, n is the refractive index, f is the focal length and NA is the numerical aperture, while $0.3 \leq NA \leq 0.5$; $1.5 \leq n \leq 2.0$ and the magnification $V \leq 0.1$.

* * * * *